United States Patent Office 3,407,042
Patented Oct. 22, 1968

3,407,042
WELL TESTING METHOD
Loren W. Slentz, Laguna Beach, Calif., assignor to Chevron Research Company, a corporation of Delaware
No Drawing. Filed June 24, 1965, Ser. No. 466,808
8 Claims. (Cl. 23—230)

ABSTRACT OF THE DISCLOSURE

A method of testing for the presence of drilling filtrate in a well sample comprising adding nitrate ion to the drilling mud and subsequently comparing the concentration of nitrate ion found in the well sample with that originally in the drilling mud.

---

This invention relates to testing wells during drilling or completion operations or the like; and, in particular, this invention relates to the testing of fluids or core material recovered from well tests.

In well drilling there is often need to know the character of the formations and their contained fluids. Most of such information is obtained from down-hole samples. Methods of ascertaining the properties of formations penetrated by a well include drill stem tests and wire line tests. Another method involves the taking of core samples, either from the side of the hole or from the drilling face of the hole. During such sampling oil, gas, and water may be recovered from a particular zone of interest. It is seldom possible, however, to completely exclude drilling or coring fluid from the test zone so that a certain amount may be recovered during the test. It is often of vital importance to be able to ascertain the relative proportion of filtrate to connate water in the samples.

Heretofore, methods used to determine filtrate invasion of samples included comparing the resistivity of the recovered water with the resistivity of the mud filtrate to give an indication of whether the recovered water is filtrate water or connate water. However, this method is not satisfactory when there is no great distinction between the drilling filtrate and the connate water salinities. Another method used heretofore involved the use of fluorescein dye as an additive to the mud system. If the recovered water has traces of dye in it, then drilling filtrate invasion of the sample is assumed to have occurred. This method is described in U.S. Patent 3,173,293. However the use of fluorescein dyes has not been found to be satisfactory due, in large part, to the affinity of the dye to adsorb on formation surfaces and on the mud filter cake. It is also not possible to visually detect the degree of color change using the fluorescein method and thus recourse to laboratory color comparison instruments, such as a spectrophotometer, is necessary to determine the percent of dye present in a sample. In addition, the use of fluorescein dye is difficult in drilling muds containing hydroscopic control additives. For example, tannic acid, chrome lignosulfonate, chrome lignite or lignite are often present in the mud and tend to discolor the mud filtrate. It has been found very difficult, if not impossible, to obtain a reliable test using fluorescein dye when such additives are in the mud. Since hydroscopic control additives are used in a substantial portion of the wells drilled, the use of fluorescein dye for the above-described purpose is severely limited. Further, the use of fluorescein dye in oil systems is not desirable since fluorescein interferes with a common well testing procedure.

There is need, therefore, for a visual method of determining filtrate invasion of connate water in well sampling, which method is reliable and accurate under the adverse conditions found in a variety of drilling and sampling operations. There is further a need for a well testing method which can be done on a visual comparison basis in the field.

In accordance with the present invention, nitrate ion ($NO_3^-$) is added to the drilling mud to provide an indicator in the mud. Nitrate ion rarely occurs in natural formation waters (connate water), thus the water returned with the sample is analyzed for the presence of nitrate ion to determine what, if any, filtrate invasion of the sample has occurred. The nitrate ion determination is made visually in the field by comparing the color of a suitably treated sample with the colors of prepared reference samples to determine the concentration of nitrate ion in the sample and thus to determine the amount, if any, of filtrate invasion of the sample.

It is a particular object of the present invention to provide a visual method of determining drilling filtrate invasion of samples by utilizing nitrate ion tracers in the drilling mud and by colorimetrically analyzing the sample to determine the amount, if any, of nitrate ion present to give an indication of sample contamination. Further objects and advantages of the present invention will be readily apparent from the following detailed description:

The nitrate ion for use in the mud system, in accordance with the present invention, is obtained from any readily available source of nitrate ion. Suitable sources include ammonium nitrate, sodium nitrate, and potassium nitrate. One satisfactory source of nitrate for use in drilling mud is common fertilizer. For example, the Ortho Division of the California Chemical Company produces a Prilled Ammonium Nitrate Fertilizer (33.5–0–0) which has been used in accordance with the present invention and which proved satisfactory and inexpensive for the purpose.

The nitrates are readily soluble in water and present no particular problem in mixing into the mud system. They are chemically stable for the average time necessary to drill a well and they are not altered or removed by contact with solids or fluids present in a mud system or encountered during drilling. It has been found that in order to easily obtain field information regarding the samples the concentration of nitrate ion in the drilling mud should be at least 10 p.p.m. based on the water content of the mud. Thus, when no stain problems or salinity problems are involved, the concentration of the nitrate ion in the water content of the drilling mud should be at least 10 p.p.m. This concentration permits visual color comparison of the sample with reference samples to indicate filtrate invasion in about 5% increments.

When additives are used with the drilling mud which stain the filtrate or when salinity problems are apparent a large dilution of the sample is sometimes necessary in order to obtain a definitive test for the nitrate ion. In these cases it is desirable to prepare a mud system having nitrate ion content of between 200 and 1000 p.p.m. of the water content of the mud. The concentration in this range allows dilution of up to 100:1 while still retaining the ability to detect the filtrate invasion in incremental steps of about 5%. In ordinary mud systems then about 1 pound of nitrate per 10 barrels of mud is adequate. In mud systems having a stained filtrate and where substantial dilution of the sample is required from 2 to 3 pounds of nitrate per 10 barrels of mud is recommended. It has been found that if the discoloration of the filtrate mentioned above prevents a readily visually inspectable sample, dilution of the sample to a point where the effect of the stain is minimized should be done. In a like manner, if the total salinity of the sample is greater than about 40,000 p.p.m., then the sample should be diluted to a salinity below about 40,000 p.p.m.

The nitrate ion has been found to be an ideal tracer for use in the present invention because the ion rarely occurs in natural formation waters. Further, the nitrate ion is equally useful in oil-based or water-based muds. The ion is relatively stable in mud systems and is not readily adsorbed on the filter cake or on the formation surface. In addition, the presence of the nitrate ion does not hamper the reliability of the numerous methods of well logging, such as nuclear magnetism logging.

The preferred field test for the nitrate ion is the RDC (reduction-diazotization coupling) method. This method for testing for nitrates is set out in the July 1958 issue of Power. Briefly the test procedure includes adding three reagents to the sample to obtain a color ranging from pink to red depending on the amount of nitrate ion present in the sample. The reagents are safe and relatively stable. For ease of discussion the reagents are numbered 1, 2, and 3. Set out below are the methods of preparing each of the reagents.

Reagent 1.—Dissolve 42 grams of tartaric acid in 6.5 grams of manganese sulfate monohydrate in distilled water and dilute to 100 ml.

Reagent 2.—Mix by grinding in a dry mortar 97.5 grams NaCl and 2.5 grams N-(1-naphthylenediamine dihydrochloride). Make into pellets weighing about 135 mgs.

Reagent 3.—Mix by grinding in a dry mortar 74 grams of NaCl, 10 grams of urea, 3 grams zinc dust, and 3 grams sulfanilamide. Make into pellets weighing about 135 mgs.

This method is particularly useful in determining the nitrate ion concentration in the range from 0–20 p.p.m. nitrate in a 15 ml. sample. The test procedure is as follows: A set of color standards for visual comparison is first prepared. Fifteen ml. portions of clean water containing 20, 10, 5, 2, 1, and ½ p.p.m. nitrate ion are first prepared. Two ml. of liquid Reagent 1 is added to each of the portions and mixed. One tablet of Reagent 2 and one tablet of Reagent 3 are then simultaneously added to each of the portions. The portions are mixed and several minutes are allowed for the color to develop. A distinct range of color should be apparent in the samples, varying from very light pink to almost red. These concentrations cover the range of nitrate concentrations in which the test is effective.

A suitable sequence of steps for testing for the presence of nitrate in the recovery water samples are as follows: If the water is dirty with sediment filter it through any filtrate paper until no suspended material remains in the water. Take 15 ml. of the sample water and add Reagents 1, 2, and 3 in the same order as described with regard to the standard reference samples above. If color develops compare the color of the sample with the reference set for actual concentration of nitrate. If the drilling mud, for example, was 100 p.p.m. nitrate (this may be determined by actual analysis as set out above) and the unknown sample tests 10 p.p.m. nitrate, then it may be reasoned that the invasion of filtrate was on the order of 10%. If the unknown gives a color that is comparable to the most concentrated reference solution, then dilute the unknown sample 2:1 and test again. Continue this procedure until a reading of less than the highest reference sample is obtained. Multiply the concentration finally ascertained by the appropriate number of dilutions to obtain the actual number of concentrations.

As mentioned above, many muds contain additives, such as chrome lignosulfonate, chrome lignite, and lignite which cause the filtrate to be very brown or almost black in color. Under severe circumstances it may be impossible to make the normal visual colorimetric test for the nitrate ion without first removing the black color. The objectionable color may be removed as set out below.

Place approximately 5 grams of $Ca(OH)_2$ in 30 cc. of the stained sample. Shake vigorously for 30 seconds, and filter through any ordinary filter paper. This will provide about 20 cc. of fluid which should be nearly colorless. In some instances, however, the concentration of the lignites is higher than normal, and the above treatment does not clean up the solution. In such instances, dilute the still brown-colored sample 1 to 5 or 10, and repeat above procedure using 30 cc. of sample and 5 grams of $$Ca(OH)_2$$

The relatively clear sample is then tested as set out above for the presence of nitrate. The $Ca(OH)_2$ contains a trace amount of nitrate ion and may give a faintly pink color (½ p.p.m.) to an otherwise nitrate-free sample. If in doubt, run a blank.

As also mentioned above, the brown filtrate problem can sometimes be handled without the $Ca(OH)_2$ step through dilution. Use 1 or 2 cc. of filtrate and dilute in a ratio of 50 or 100 to 1 (whatever provides a reasonably clear solution) with distilled or nitrate-free water. This will probably require addition of more nitrate to the mud system, say two or three times as much as normally recommended; i.e., 2 to 3 pounds per 10 barrels instead of 1 pound per 10 barrels.

A number of demonstrations have been conducted utilizing the method of the invention. These demonstrations showed the advantages of the invention and the ease of use and ability to do the test at the well site.

Demonstration I.—A well was drilled through what was thought to be the producing interval of a Lower Cretaceous sand. The depth of the interval was from 3276 to 3295 feet. The mud was oil-emulsion mud and the volume of the mud system was 350 barrels. Ffteen pounds of $NaNO_3$ were added to the mud system two hours before drilling through the interval. The fifteen pounds of $NaNO_3$ gave a concentration of approximately 100 p.p.m. in the filtrate.

A wire line test of the formation was run at 3278.5 feet to attempt to determine if the water-oil contact was at or near this depth. Recovered in the test were 14.6 cubic feet of gas; 6900 cc. of oil (23.5° gravity at 63° F.); and 2400 cc. of water. The recovered water was tested in accordance with the present method and the test showed that the recovered water contained 100 p.p.m. of nitrate ion. This showed that the recovered water was all filtrate.

As a result of this test it was decided that the formation was suitable for completion since it was not too close to the water-oil interface which would result in excess water production. Pipe was set at 3279.5 feet and the initial production of the well was 36 barrels/day of 23.5° gravity oil with a gas-oil ratio of 300 m.c.f. There was no water cut.

Demonstration II.—A well was being drilled in the Flat Lake Field on the Ratcliff formation at a depth of about 6500 feet when a conventional drill stem test was made. The mud system was a salt-based mud gel. The concentration of nitrate ion in the mud system was approximately 200 p.p.m. The mud volume was approximately 200 barrels. Nitrate ion was added to the system a few hours before testing.

The drill stem test recovered 450 feet of slightly oil-mud fluid. The test for nitrate ion was run at various levels of recovered fluid in accordance with the present invention. At 180 feet above the drill stem test tool the $NO^-_3$ concentration showed that the recovered water was 100% filtrate. At the level of the tool the nitrate ion showed that the recovered water was 60% filtrate and 40% formation water. In the actual drill stem test tool chamber the nitrate ion test indicated that the recovered water was 35% filtrate and 65% formation water.

Demonstration III.—In a different well in the Flat Lake Field at about 6500 feet, a conventional drill stem test was run. The mud system was salt-based gel spiked with approximately 200 p.p.m. nitrate ion. The drill stem test recovered 1000 feet of fluid about half oil and half water. The water was tested for nitrate ion in accordance with the present method. The test showed that the recovered water was entirely filtrate.

Although only a few embodiments of the invention have been specifically described, the inventive concept is not limited by these embodiments but is meant to include all equivalents included in the scope of the claims.

I claim:

1. A method of testing for the presence of drilling filtrate in a well sample comprising the steps of preparing a drilling mud having a known concentration of nitrate ion, using said mud in drilling a well, making a well test to obtain a liquid sample, analyzing the sample for the presence of nitrate ion, and comparing the concentration of nitrate ion found in the sample with the concentration of nitrate ion in the drilling mud to determine the invasion of the liquid sample by the drilling mud filtrate.

2. Method of claim 1 is further characterized by colorimetrically comparing the well sample with a set of standard solutions whose concentration of nitrate ion is known.

3. Method of claim 2 where the color comparison is done visually.

4. A method of well testing comprising preparing a drilling mud with a concentration of from 200 p.p.m. to 1000 p.p.m. of nitrate ion in the liquid phase of said mud, using said mud in a well, making a well test to obtain a sample, colorimetrically analyzing the liquid portion of said sample for the presence of nitrate ion and comparing the concentration of nitrate ion in said sample with the concentration of nitrate ion in the drilling mud.

5. The method of claim 4 where the liquid phase of said drilling mud contains staining additives further characterized by adding a substance to the liquid phase to clear the liquid phase prior to the analyzing step.

6. The method of claim 5 where the substance is water.

7. The method of claim 5 where the substance is $Ca(OH)_2$.

8. A method of examining water returned from a well to determine the extent if any of the concentration of connate water in the returned water comprising spiking water to be introduced into a well with a known concentration of nitrate ion, introducing said spiked water into a well, taking a water sample from a well, adding reagents to the water sample to cause a color to form if there are nitrate ions in said water sample and comparing the color so formed with a set of standard colors to give an indication of the amount of nitrate ion in said water sample.

References Cited

UNITED STATES PATENTS

| | | | |
|---|---|---|---|
| 2,195,798 | 4/1940 | Jones et al. | 23—230 X |
| 2,207,348 | 7/1940 | Jones et al. | 23—230 X |
| 2,348,639 | 5/1944 | O'Brien | 23—230 X |
| 2,553,900 | 5/1951 | Doan et al. | 23—230 X |
| 3,003,856 | 10/1961 | Boyd | 23—230 X |
| 3,173,293 | 3/1965 | Eckels | 73—155 |

OTHER REFERENCES

Howard C. Pyle et al.: Oil Weekly, pp. 46–50, Nov. 16, 1936.

MORRIS O. WOLK, *Primary Examiner.*

S. MARANTZ, *Assistant Examiner.*